June 2, 1931.    K. ALBRECHT    1,808,126
BEARING FOR THE CYLINDERS OF PRINTING MACHINES
Filed Aug. 7, 1928
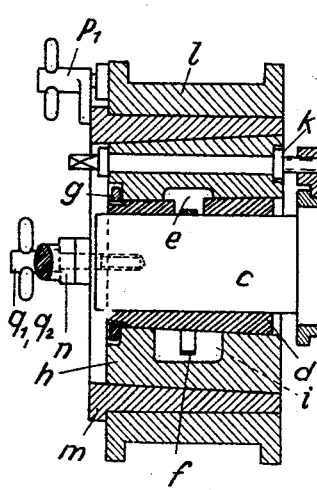
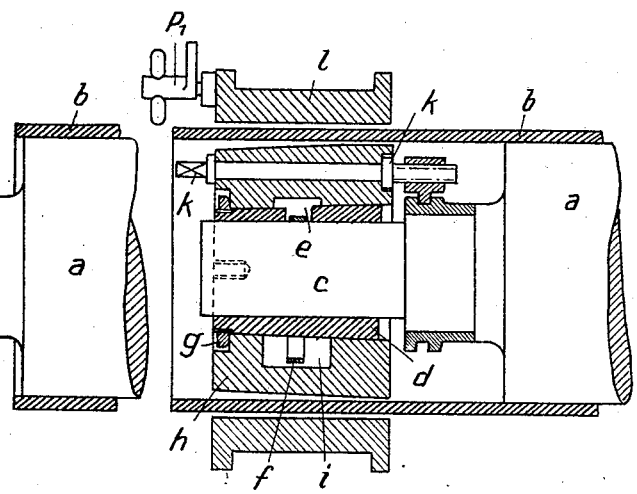
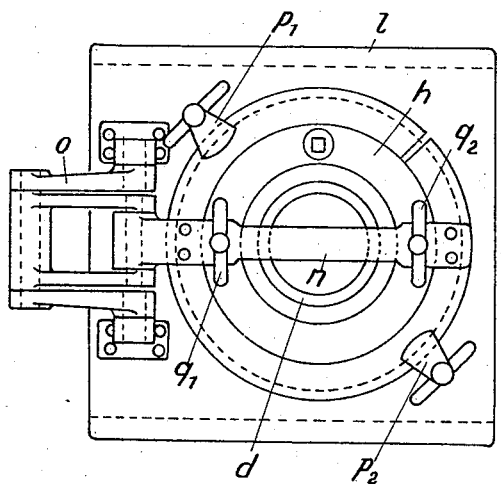
Inventor:
K. Albrecht Patented June 2, 1931

1,808,126

UNITED STATES PATENT OFFICE

KARL ALBRECHT, OF GEISENHEIM-ON-THE-RHINE, GERMANY, ASSIGNOR TO MASCHINENFABRIK JOHANNISBERG, G. M. B. H., OF GEISENHEIM-ON-THE-RHINE, GERMANY

BEARING FOR THE CYLINDERS OF PRINTING MACHINES

Application filed August 7, 1928, Serial No. 298,015, and in Germany August 10, 1927.

This invention relates to bearings for the cylinder of printing machines and consists essentially in providing different conical and adjustable parts which are movable with respect to each other in axial direction so as to permit to adjust the bearing in such a manner that any play which may arise during operation of the machine may easily be done away with.

Bearings for the cylinders of printing machines, especially of intaglio printing machines, are subject to very severe strains due to constantly varying pressures. Thus, a considerable pressure is exerted during the greater part of the revolution of the cylinder, while during another smaller part of the revolution of the cylinder there will be no pressures at all exerted on the latter. Besides, the bearings of the cylinders must be arranged to permit lateral displacement of the cylinder which rotates in said bearings, and in addition to this the bearings must be constructed in such a manner that its several members may be partly or wholly exchanged in order to permit exchange of the cylinders or of the etched copper-rollers which are mounted upon said cylinders.

It is evident that on account of these unfavorable conditions of pressures existing in printing machines there will soon be produced a play between the several members of the bearing, this play causing, at the beginning and at the end of the printing period, motions and vibrations of the cylinders which motions and vibrations will exert an extremely unfavorable influence upon the operation of printing.

The aforementioned drawbacks and disadvantages connected with intaglio printing machines are avoided by this invention and at the same time the advantage will be secured that the cylinders or the copper tubes mounted thereon may be easily exchanged.

The accompanying drawings, show an example of the cylinder bearing according to my invention, Fig. 1 being a longitudinal section through a bearing in condition ready for use, Fig. 2 a longitudinal section through the bearing as shown in Fig. 1 after having removed the copper-tube from the cylinder, and Fig. 3 a front view taken on Fig. 1.

Referring now more particularly to the drawings, $a$ represents a cylinder of a printing machine, said cylinder carrying a copper tube $b$. The cylinder $a$ is provided with journals $c$ mounted within a slotted exteriorly conical bronze sleeve or bushing $d$. This sleeve or bushing $d$ is provided with a cut-away part or recess $e$ serving for the reception of a lubricating ring $f$. The sleeve or bushing $d$ may be adjusted by means of the adjusting nuts $g$ and is surrounded by a further sleeve or bushing $h$ which is of conical shape at its outer as well as at its inner periphery. Within the bushing $h$ there is provided the oil chamber $i$. The sleeve or bushing $h$ furthermore carries the adjusting means serving for adjusting the cylinder in a lateral direction. Intermediate the sleeve $h$ and the bearing-body proper $l$ there is inserted the slotted conical pressure-ring $m$ which is equipped with a handle $n$ mounted on a suspension device $o$ which is swivelled to the fixed casing of the bearing. The holding screws $p^1$ and $p^2$ serve for keeping the pressure-ring $m$ in position, while the adjusting screws $q^1$ and $q^2$ connect the handle $n$ with the sleeve $h$.

The mode of operation of the device as above described is as follows:

If it is intended, for instance, to exchange a copper tube, the adjusting screws $q^1$ and $q^2$ are drawn tight, thereby moving the sleeve $h$ somewhat towards the inside and by means of the adjusting device $k$ serving for laterally adjusting the cylinder $a$, the latter will be moved somewhat towards the inside. The pressure-ring $m$ will thus be released and may now be withdrawn from the sleeve $h$ by the aid of the handle $n$ after unscrewing the holding screws $p^1$ and $p^2$ and the adjusting screws $q^1$ and $q^2$. By means of the suspension device $o$ which is swivelled to the fixed casing $l$ of the bearing the pressure-ring will first be carried straight towards the front and may thereupon be swung out towards the side. By the aid of this suspension device it will be possible to again conveniently and securely introduce the pressure-ring at some later time.

After removing the pressure-ring $m$ the copper tube $b$ may be passed through the interstice produced intermediate the fixed casing $l$ of the bearing and the sleeve $h$, as may be seen from Fig. 2. Since the greatest diameter of the interiorly as well as exteriorly conical sleeve or bushing $h$ is equal or approximately equal to the diameter of the bore of the copper-tube $b$, said bushing $h$ will serve as a supporting member for said copper-tube and essentially facilitate mounting and dismounting of the latter.

In order to mount the copper-tube $b$ on the cylinder $a$ the reversed sequence of steps is observed. After the tube $b$ has been placed upon the cylinder $a$ and fixed thereon by the aid of the sleeve $h$ serving as a support, the pressure-ring $m$ is introduced and kept in position by means of the holding screws $p^1$ and $p^2$. Thereupon the adjusting screws $q^1$ and $q^2$ are screwed in and by means of said adjusting screws the sleeve $h$ is drawn into the pressure-ring and fixed therein. By so drawing tight the several elements of the bearing all play at the bearing surfaces will be completely avoided.

If the bronze bushing $d$ should wear out after some time and the bearing journal play in the bearing, this may easily be remedied by adjusting said bushing by means of the adjusting nut $g$. By the aid of the device $k$ which serves for the lateral adjustment of the cylinder $a$ the latter may at any time be placed into its proper position with respect to the paper to be printed upon. This adjusting device $k$ consists of a spindle rotatably mounted within the sleeve $h$ and secured against axial displacement. Said spindle engages with an annular groove provided on the cylinder body $a$ by means of a nut mounted on a thread on said spindle, as indicated in Figs. 1 and 2 of the drawing.

I claim:

1. A bearing for the cylinder of printing machines, comprising in combination, a journal, a bushing on the journal provided with a conical outer surface, a sleeve having its outer as well as its inner surface conical, a fixed casing having a cylindrical bore, and a slotted conical pressure-ring interposed intermediate said sleeve and said fixed casing for releasably holding the conical parts in position and capable of independent withdrawal.

2. A bearing for the cylinder of printing machines, comprising in combination a journal, a bushing on the journal provided with a conical surface, a sleeve having its outer as well as its inner surfaces conical, a fixed casing having a cylindrical bore, a slotted conical pressure-ring interposed intermediate said sleeve and said fixed casing, and cylinder adjusting means on said first mentioned sleeve.

3. A bearing for the cylinder of printing machines, comprising in combination with the cylinder and a copper tube thereon, a journal, a bushing on the journal provided with a conical surface, a sleeve having its outer as well as its inner surface of conical shape, a fixed casing having a cylindrical bore, a slotted conical pressure-ring interposed intermediate said sleeve and said fixed casing, said pressure-ring having a diameter approximately equal to the diameter of the copper tube carried by said cylinder, so that after removal of the ring a space is provided through which the copper tube may be removed.

4. A bearing for the cylinder of printing machines, comprising in combination a journal, a bushing on the journal provided with a conical surface, a sleeve having its outer as well as its inner surface of conical shape, a fixed casing having a cylindrical bore, a slotted conical pressure-ring interposed intermediate said sleeve and said fixed casing, and said sleeve having a recess on its interior surface for holding lubricating means.

5. A bearing for the cylinder of printing machines, comprising in combination a journal, a bushing on the journal provided with a conical surface, a sleeve having its outer as well as its inner surface of conical shape, a fixed casing having a cylindrical bore, a slotted conical pressure-ring interposed intermediate said sleeve and said fixed casing with cylindrical bore, said bushing having a cut-away part, and a lubricating ring mounted in said cut-away part of the ring.

6. A bearing for the cylinder of printing machines, comprising in combination with the cylinder having an annular groove, a journal, a bushing on the journal provided with a conical surface, a sleeve having its outer as well as its inner surfaces of conical shape, a fixed casing having a cylindrical bore, a slotted conical pressure-ring interposed intermediate said sleeve and said fixed casing mounted on said first mentioned sleeve including an adjusting device, a spindle mounted rotatably within said sleeve and secured against axial displacement therein and provided with an inwardly projecting threaded portion, and a nut mounted on the threaded portion of said spindle and engaging the annular groove of said cylinder.

7. A bearing for the cylinder of printing machines comprising in combination a journal, a bushing on the journal provided with a conical surface, a sleeve having its outer as well as its inner surfaces of conical shape, a fixed casing having a cylindrical bore, a slotted conical pressure-ring interposed intermediate said sleeve and said fixed casing, a suspension device for the pressure ring swivelled to the fixed casing for first drawing out said conical pressure-ring, thereupon swinging the same towards the side and then again moving the same back into its exact position with respect to said fixed casing.

In testimony whereof I affix my signature.
KARL ALBRECHT.